US006574864B1

(12) United States Patent
Meissner et al.

(10) Patent No.: US 6,574,864 B1
(45) Date of Patent: Jun. 10, 2003

(54) METHOD FOR MANUFACTURING A CONTACT ARRANGEMENT FOR A VACUUM SWITCHING TUBE

(75) Inventors: Johannes Meissner, Bonn (DE); Gerhard Rossmann, Karlsruhe (DE); Jerrie Lipperts, Venlo (NL); Alfredo Lietz, Frechen (DE)

(73) Assignee: Moeller GmbH, Bonn (DE)

( * ) Notice: Subject to any disclaimer, the term of this patent is extended or adjusted under 35 U.S.C. 154(b) by 0 days.

(21) Appl. No.: 09/488,755

(22) Filed: Jan. 21, 2000

(30) Foreign Application Priority Data

Jan. 22, 1999 (DE) ........................................ 199 02 500

(51) Int. Cl.[7] ......................... H01R 43/02; B23K 31/02

(52) U.S. Cl. ............................. 29/877; 29/876; 29/878; 29/879; 228/258

(58) Field of Search .......................... 29/877, 876, 878, 29/879; 228/258, 256

(56) References Cited

U.S. PATENT DOCUMENTS

| | | | | |
|---|---|---|---|---|
| 3,055,098 A | | 9/1962 | Bratkowski et al. | |
| 3,191,274 A | * | 6/1965 | Gwyn, Jr. et al. | 29/879 |
| 3,600,795 A | * | 8/1971 | Brundin | 228/124.1 |
| 4,795,866 A | * | 1/1989 | Hoene et al. | 218/134 |
| 5,107,095 A | * | 4/1992 | Derbyshire | 219/230 |
| 5,816,868 A | * | 10/1998 | Legrady et al. | 228/215 |

FOREIGN PATENT DOCUMENTS

| | | |
|---|---|---|
| DE | 11 27 180 | 4/1962 |
| DE | 40 08 102 | 9/1991 |
| DE | 44 47 391 | 6/1996 |
| DE | 195 34 398 | 3/1997 |
| DE | 196 32 573 | 2/1998 |
| GB | 415 221 | 8/1934 |

OTHER PUBLICATIONS

US 4,940,863, 7/1990, Fujita et al. (withdrawn)

* cited by examiner

*Primary Examiner*—Carl J. Arbes
*Assistant Examiner*—Thiem D. Phan
(74) *Attorney, Agent, or Firm*—Kenyon & Kenyon

(57) ABSTRACT

A method for manufacturing a contract arrangement for a vacuum switching tube having a contact carrier and a contact piece joined to the contact carrier in a vacuum using soldering material. The contact carrier is made of electrically highly conductive material, for example, copper, and the contact piece is made of a flame-resistant sintering material containing copper. The contact piece is pressed flat directly onto the contact carrier, generating a gap along the contact surface, and the soldering material is arranged on areas directly bordering the gap of the contact surface between the contact piece and the contact carrier. Subsequently, in a vacuum through the application of heat, the soldering material is brought to the melting point, and the molten soldering material penetrates into the gap of the contact surfaces between the contact carrier and the contact piece.

22 Claims, 4 Drawing Sheets

METHOD FOR MANUFACTURING A CONTACT ARRANGEMENT FOR A VACUUM SWITCHING TUBE

FIELD OF THE INVENTION

The present invention relates to a method for manufacturing a contact arrangement for a vacuum switching tube having a contact carrier and a contact piece that is joined to the contact carrier in a vacuum using a soldering material.

RELATED TECHNOLOGY

A method for manufacturing a contact arrangement for a vacuum chamber is described in German Patent Document No. 196 32 573 A1, in which the contact carrier in a vacuum is coated with a contact layer through sintering an appropriate powder and its subsequent solidifying. It is further known to solder a contact carrier to a contact piece in a vacuum using a soldering material that is arranged in between, by melting the soldering material and pressing contact carrier and contact piece together. Mechanical, frictional-locking bonds between contact piece and contact carrier are also known, reference being made, by way of example, to German Patent Document No. 44 47 391 C1 and German Patent Document No. 195 34 398 A1.

In FIGS. 1*a* and 1*b*, there is a schematic illustration of a known method for producing a soldered connection between a contact carrier 1 and a contact piece 10 using an intermediate layer of a soldering material 11, for example a soldering disk. In this context, contact piece 10 is preferably provided with a saucer-shaped recess 101, into which are set soldering disk 11 and then contact carrier 1 at its mounting end. After being heated in the vacuum, soldering disk 11 melts and produces soldered connection 30 between contact carrier 1 and contact piece 10. In this method, it is disadvantageous that in the hanging arrangement of contact piece 10 on contact carrier 1, a sufficient positive locking between contact piece and contact carrier must be present during the production of the soldered connection in order to prevent contact piece 10 from falling away in the melting of the soldering disk. In the hanging arrangement, in the case of larger contact pieces, it is frequently necessary, during the soldering process in the vacuum, to employ auxiliary structures in order to prevent the contact piece from falling away or, on the other hand, to provide for a supplementary positive locking of contact piece 10 on contact carrier 1.

SUMMARY OF THE INVENTION

An objective of the present invention is to provide a method by which a contact arrangement having soldered bonding sites can be manufactured reliably and more simply using a smallest possible optimal quantity of soldering material.

The present invention provides a method by which the contact piece is directly pressed flat onto the contact carrier, leaving a gap along the contact surface, and the soldering material is arranged in areas directly bordering on the gap of the contact surface between the contact piece and the contact carrier, and subsequently, in a vacuum, through applying heat, the soldering material is brought to the melting point and the melted soldering material penetrates into the gap of the contact surfaces between the contact carrier and the contact piece.

The method according to the present invention can be applied with particular advantage to the manufacture of contact arrangements for vacuum switching tubes. The method according to the present invention makes it possible for the contact surface between contact carrier and contact piece to be wetted with soldering material on virtually its entire surface, i.e., sufficiently. In addition, the bond between contact carrier and contact piece is strengthened through the melted soldering material rising in the gap—the annular gap—between contact carrier and contact piece, the gap being mainly vertical and, towards the exterior, adjoining the contact surface between contact carrier and contact piece. Depending on the type of configuration, an optimal dosing is possible of the quantity of soldering material that is required to achieve the sufficient soldered connection between contact carrier and contact piece. In particular, the method according to the present invention makes it possible, in a simple manner, to produce a contact carrier having a contact piece hanging from it, i.e., in the hanging position. Applying the method according to the present invention to the production of vacuum switching tubes makes it possible to manufacture, for example, all of the soldering points of a preassembled vacuum switching tube in one processing step, i.e., in one oven cycle.

According to one version of the present invention, a contact piece is used that has a planar, saucer-shaped recess, into which the contact carrier at its mounting end is set, an annular gap between contact piece and contact carrier being formed at the planar gap of the contact surface, and the soldering material being placed in ring-like fashion around the contact carrier at the annular gap emerging between contact carrier and contact piece, so that after the melting, the soldering material is pulled by gravity and capillary action into the annular gap and the gap along the saucer-shaped recess. In this variant of the method according to the present invention, a virtually full-surface wetting of the contact surface between the contact carrier and the contact piece is achieved by the molten soldering material flowing and pressing into the gap from the sides. In addition, however, as a result of the solder collecting in the lateral vertical gaps, a good bond of great stability is achieved between contact carrier and contact piece.

According to a further version of the present invention, however, it is also possible to introduce the soldering material via bore holes that lead through the contact carrier to the contact surface between the contact carrier and contact piece. According to one version of the present invention, a contact piece is used that has a planar, saucer-shaped recess, into which the contact carrier at its mounting end is set, and, additionally, a contact carrier is used, which has at least one bore hole running through the contact carrier to the contact surface having the saucer-shaped recess, and the soldering material is poured into the bore holes of the contact carrier so that, after the melting, due to gravity and capillary action, the soldering material presses into the gap along the saucer-shaped recess, including into the circumferential annular gap.

For these process techniques, the solder can be placed into the bore holes of the contact carrier in the form, for example, of wire. In addition, these bore holes make possible an improved degasification of the space between the contact piece and contact carrier.

In a further embodiment of the method, it is proposed that a contact piece may be used that has a planar, saucer-shaped recess, into which the contact carrier at its mounting end is set, and a contact carrier be used, which, at its contact surface adjoining the saucer-shaped recess, has at least one recess, and the soldering material be poured into the recess of the contact carrier, so that, after the melting, the soldering material penetrates, due to gravity and capillary action, into the gap along the saucer-shaped recess, including into the peripheral annular gap.

In all of these cases, during the soldering, an oversupply of soldering material rises up again through the vertical gaps and bore holes, so that an optimal wetting and dosing of the soldering material is possible.

A further example of a method according to the present invention provides setting a contact piece into a saucer-shaped recess of a contact carrier and applying the soldering material in the form of a soldering paste onto the contact piece and over the annular gap end between the contact carrier and contact piece, so that, after the melting, the soldering material is pulled by gravity and capillary action into the gap along the saucer-shaped recess.

Here, too, it is possible to fix the contact piece on the contact carrier without a positive-locking or frictional connection. This variant is designed especially for securing contacts in the non-hanging position. As a solder paste, it is preferred to use one having a silver or copper base, the binding agent or binders evaporating during the heating-up process in a vacuum, leaving no residue. During the time when the soldering material is in a molten liquid state in a vacuum, the contact piece is held by the surface tension of the soldering material and/or the latter's adhesive force, so that precise positioning is also assured.

To achieve a good contact soldering and sufficient stability of the bond between contact piece and contact carrier, it is proposed that an amount of soldering material be used such that, after the complete wetting of the gap between contact carrier and contact piece, the remaining molten mass of solder is used to seal the solder supply points, for example, as a residual plug seals the solder supply points.

Thus the method according to the present invention makes it possible to satisfactorily manufacture soldered connections between contact pieces and contact carriers even in a hanging arrangement, the method being particularly advantageous when applied in connection with vacuum switching tubes. The method according to the, present invention can be refined and applied in that the contact arrangement composed of contact carrier, contact piece, and soldering material is preassembled into a unit having further components constituting the vacuum switching tube, components that are bonded to each other at soldering points using soldering material, along with a second contact arrangement, a shielding part, cover parts, insulating parts, and a bellows, and the preassembled unit being placed into a vacuum soldering oven, one of the two contact arrangements being in the hanging position of the contact piece and, under the influence of the vacuum, the simultaneous melting of all of the soldering material being effected at all of the soldering locations by heat, so that all of the soldered connections of the vacuum switching tube are produced in one process step.

According to the present invention, therefore, the soldering points of a piece to be connected, i.e., specifically, of the contact piece having a contact carrier, can be produced both in the hanging position as well as in the standing position. Since the soldering material penetrates into the gap between contact piece and contact carrier only after melting, there is no falling away due to excessive solder melting, which is the case when the soldering material is arranged beforehand between contact carrier and contact piece. For carrying out the method according to the present invention, at least for the soldered connection to be generated in the hanging position, a mechanical, clamping bond or mechanical positive-locking fit is sufficient to avoid a falling away of the contact piece from the contact carrier during the production of the soldered connection.

In order to prevent a not-yet-soldered contact piece from falling away from the contact carrier during a soldering process in the hanging position, the proposal is made to provide for a mechanical and/or friction-locking and/or form-locking bond at least in areas between the contact piece in the contact carrier by configuring them appropriately outside of the contact surfaces of contact piece and contact carrier forming the planar gap, the bond being produced in the assembly of contact piece and contact carrier. A mechanical bond of this type between contact piece and contact carrier can be provided, for example, through creating a profiling at least in areas on the lateral surface of the contact carrier and/or, if appropriate, also on the interior-side lateral surface of the recess of the contact piece, to achieve a light clamping of the contact carrier in a saucer-shaped recess of the contact piece for sufficient stability in the hanging position. This profiling, for example, can be provided as milled knobs or knurls having fins and depressions, or also, for example, by only a single profiling in the shape of a protruding rise on the lateral surface of the contact carrier.

In the assembly of the contact carrier and contact piece, instead of achieving a mechanically stable bond for a hanging position using a skeleton form, a flanging, or profiling, the contact pieces and contact carriers to be bonded to each other can also be joined using a friction- and positive-locking bond, such as in a bayonet lock. The minimal annular gap remaining in this context can be supplied, for example, from a soldering material supply—deposit—on the contact carrier using sufficient solder, for example using a corresponding piece of soldering wire.

The projections or grooves of a bayonet lock of this type can be shaped so as to taper into a slight cone, so that by twisting the contact piece in a contact carrier made of soft copper, a clamping screw connection is achieved having a good supporting capacity. In this context, it is possible to achieve a good, planar, and friction-locking bond between the contact piece and the contact carrier. At the same time, the groove of the bayonet lock bond can function as the solder supply channel and then as the soldered connection point for the two parts to be bonded subsequently, using solder.

The contact carriers and the contact pieces, in accordance with the application purpose and the load of the vacuum switching tube, can be made from known materials, such as were described in the documents mentioned above regarding the related art.

BRIEF DESCRIPTION OF THE DRAWINGS

The present invention is explained in further detail below in exemplary embodiments with reference to the drawings, in which.

DETAILED DESCRIPTION

Figure 1A:
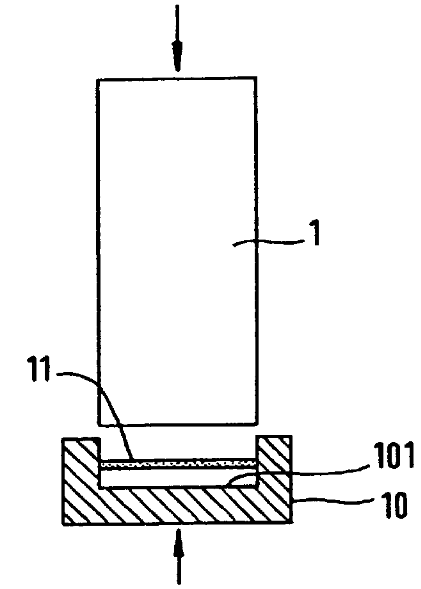
Fig. 1a PRIOR ART
FIGS. 1*a* and 1*b* show a schematic depiction of the contact soldering of a contact piece to a contact carrier using a soldering disk in accordance with the related art, before (FIG. 1*a*) and after (FIG. 1*b*) the soldering process.
Figure 1B:
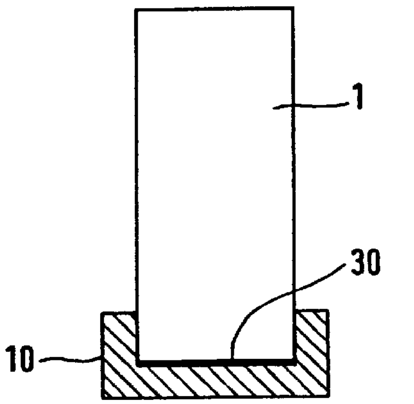
Fig. 1b PRIOR ART
Figure 7:
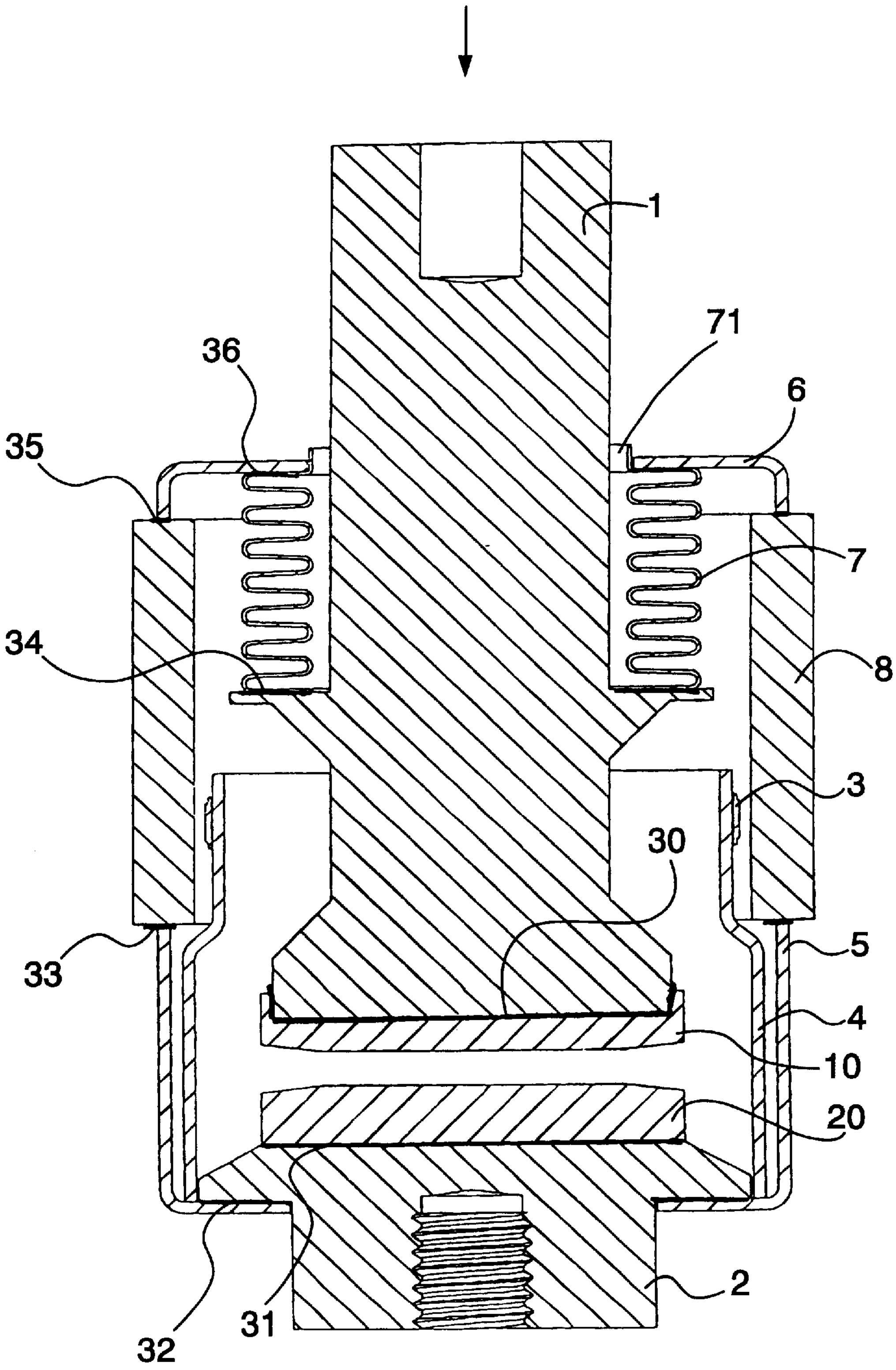
FIG. 7 shows a schematic cross-section of the vacuum switching tube after a completed contact soldering.

In FIG. 7, by way of example, a vacuum switching tube is depicted in schematic form having two contact arrangements, of which first contact arrangement 2, 20 is fixedly arranged on the housing and second contact arrangement 1, 10 is positioned in the housing so as to be movable by a bellows 7. If a soldered connection between contact carrier 1 and contact piece 10 or contact carrier 2 and contact piece 20 cannot be produced in the standing position, i.e., the contact piece is placed onto the contact carrier from above, the problem arises to devise a more reliable method for producing the soldered connection of the contact arrangement in the hanging arrangement of the contact piece. For this purpose, as a rule, according to the related art, an effective positive locking and/or frictional locking is necessary, so that in response to melting the soldering material located, as in FIGS. 1*a*, 1*b*, between the contact surfaces to be bonded, contact piece 10 does not float or slide. If, as a consequence of the saucer-shaped recess 101, see FIGS. 1*a*, 1*b*, the lateral overlap of contact piece 10 is used for the positive locking and frictional locking, then no soldered connection can form in this lateral area since no molten solder, or an insufficient amount, penetrates here.

Figure 2A:
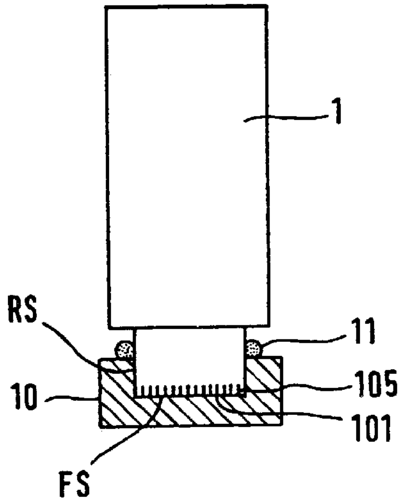
FIGS. 2*a* and 2*b* show a schematic depiction of the contact soldering of contact carrier and contact piece using soldering material disposed on the outside of the contact arrangement, before (FIG. 2*a*) and after (FIG. 2*b*) the soldering process.
Figure 2B:
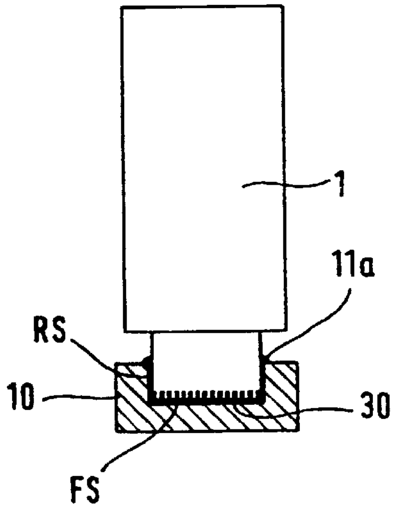

According to the proposal of the present invention, see FIGS. 2*a* and 2*b*, between the parts to be bonded to each other, namely contact piece 10 and contact carrier 1, first a sufficient positive-locking or mechanically supportive connection is produced, for example by configuring the contact piece so as to have a saucer-shaped recess 101, into which is fitted the contact carrier at its mounting end, which can be correspondingly shaped. However, it is particularly advantageous to provide for a profiling 105 at least in areas on the lateral surface of the contact carrier and/or the single-sided lateral surface of the contact piece, to achieve a light clamping effect of the contact carrier in saucer-shaped recess 101 of the contact piece for a sufficient stability in the hanging position. The profiling can be shaped, for example, as milled knobs 105 having fins and depressions. Thus an adequate positive-locking bond between contact piece 10 and contact carrier 1 is created, a contact gap between the two parts remaining along saucer-shaped recess 101, which is composed of annular gap RS, running to the outside, and planar gap FS. At the exterior circumference of the contact arrangement, where the contact gap between contact piece 10 and contact carrier 1 ends, soldering material 11, for example in an annular shape as soldering wire, is placed on the edge of contact piece 10 adjacent to contact carrier 1. Contact carrier 1, prepared in this manner, contact piece 10, which is pressed down, and soldering material 11, placed externally, are heated in a vacuum in a vacuum chamber, so that soldering material 11 melts and penetrates into gap RS between contact piece 10 and contact carrier 1 and, consequently, it is pulled into gap FS between the contact surfaces, leading to the complete or near complete, wetting by molten solder of the contact surface between contact carrier and contact piece. At the same time, solder also remains, down to the upper external edge of contact piece 10, and there forms a remaining plug 11*a*, sealing the gap to the outside, resembling a hollow channel made of soldering material. Using the method according to the present invention, it is possible also to fill the vertical gaps at the side between contact piece 10 and the contact carrier using molten solder and thus to produce a significantly improved, strengthened bond between the parts. The bonding surface wetted by soldering material is designated as 30.

Figure 3A:
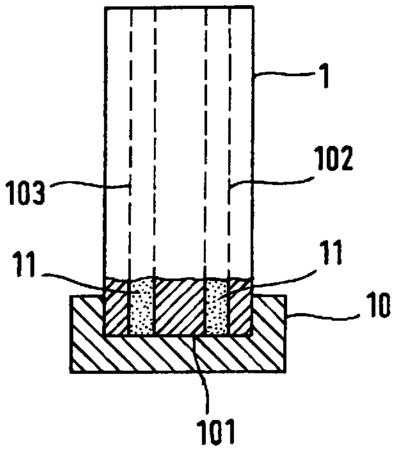
FIGS. 3*a* and 3*b* show a schematic depiction of a contact soldering of contact piece to contact carrier using soldering material fed through the contact carrier, before (FIG. 3*a*) and after (FIG. 3*b*) the soldering process.
Figure 3B:
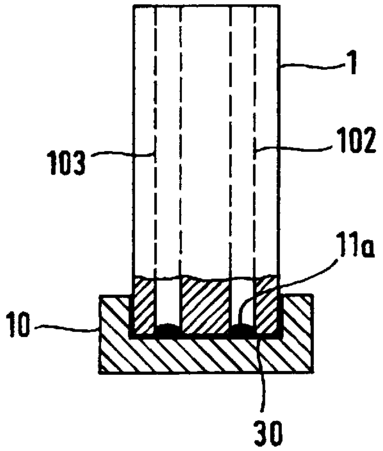
Figure 4A:
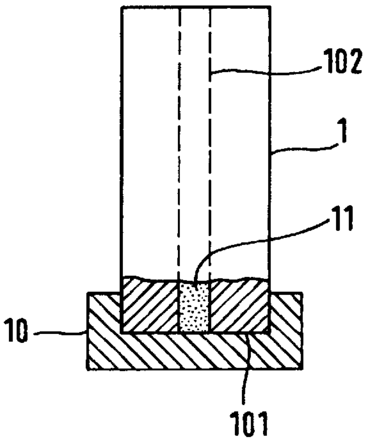
FIGS. 4*a* and 4*b* show a variant of the method shown in FIG. 3*a* and 3*b;*
Figure 4B:
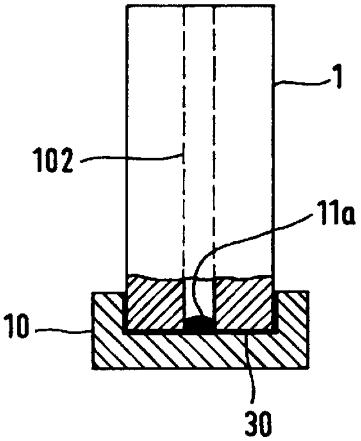

In the variant in FIGS. 3*a* and 3*b*, provision is also made at first for a light positive locking between contact piece 10 and contact carrier 1, i.e., without a soldering foil in between or, for example, a profiling, as in FIGS. 2*a* and *b*. For this purpose, contact piece 10 is configured, for example, using a saucer-shaped recess 101, into which contact carrier 1 is set. The mechanical bond produced in this manner by frictional locking and/or positive locking is sufficient to prevent contact piece 10 in the hanging position from falling out before and during the production of the soldered connection. Contact carrier 1 itself has at least one, as in FIG. 4*a*, or, for example, two, as in FIG. 3*a*, bore holes 102,103 running in the axial direction parallel to the axis, the bore holes functioning to receive soldering material 11, for example, in the form of soldering wire. Bore holes 102,103 penetrate to the contact surface at the contact piece. After the parts, preassembled in this manner, are placed into a vacuum chamber, in a vacuum, and heat is applied, soldering material 11 melts and, due to gravity and capillary action, penetrates into the gap formed between the contact surfaces of contact piece 10 and contact carrier 1 along saucer-shaped recess 101, and fills up the gap, also ascending at the lateral edges up to the upper edge, as in FIGS. 3*b* and 4*b*. The contact surface between contact carrier and contact piece is completely and adequately wetted in turn by the soldering material, and at the same time the bond between contact carrier and contact piece is strengthened by the rising soldering material at the external vertical gaps between contact piece and contact carrier. The quantity of solder is measured such that a residue of soldering material remains in the shape of a hollow channel 11*a* at the foot of bore holes 102,103, sealing them. In the event that bore holes 102, as in FIG. 4*a*, lead directly to the outside, they also function for improved degasification of the space between contact piece and contact carrier. To produce bond 30 between contact carrier 1 and contact piece 10, a relatively small quantity of solder is necessary in the application of the method according to the present invention.

Figure 5:
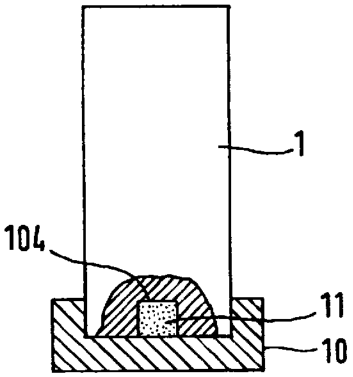
FIG. 5 shows a variant of the method shown in FIG. 4*a;*

In FIG. 5, a further possible configuration of the preceding arrangement of soldering material is depicted partially outside the contact surfaces between contact carrier and contact piece to be bonded to each other in the contact soldering, contact carrier 1 having a recess 104 at its side facing contact piece 10, the recess receiving the soldering material. Here, as well, the contact arrangement, preassembled as depicted in FIG. 5, is placed into a vacuum chamber, and there, in a vacuum, soldering material 11 is brought to the melting point through the application of heat, as a result of which it penetrates into the adjoining gaps between contact piece 10 and contact carrier 1 and, in accordance with the supply of solder, also rises into the lateral vertical gaps, thus producing the desired stable bond.

Figure 6:
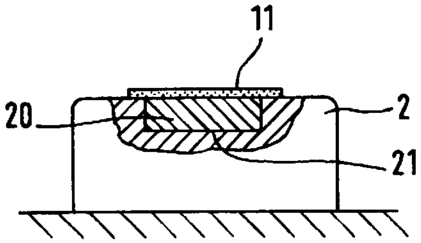
FIG. 6 shows a contact soldering for bonding a contact piece to the contact carrier using soldering paste, in a schematic depiction in the standing position.

For standing arrangements of the contact soldering of a contact piece 20 to a contact carrier 2, an arrangement in accordance with FIG. 6 is proposed, in which contact piece is also placed directly into a recess 21 on the upper side of contact carrier 2. In this manner, a positive-locking grip is already provided. The soldering material, however, is not placed into the gap between contact piece 20 and contact carrier 2, but rather on top, for example, as soldering paste 11 in a layer. During the heating procedure in a vacuum, the binding agent and binders of the soldering paste evaporate and the soldering material in a molten state can penetrate into the contact gap between contact carrier 2 and contact piece 20 along recess 21 and thus produce the desired contact soldering in this area.

Figure 8A:
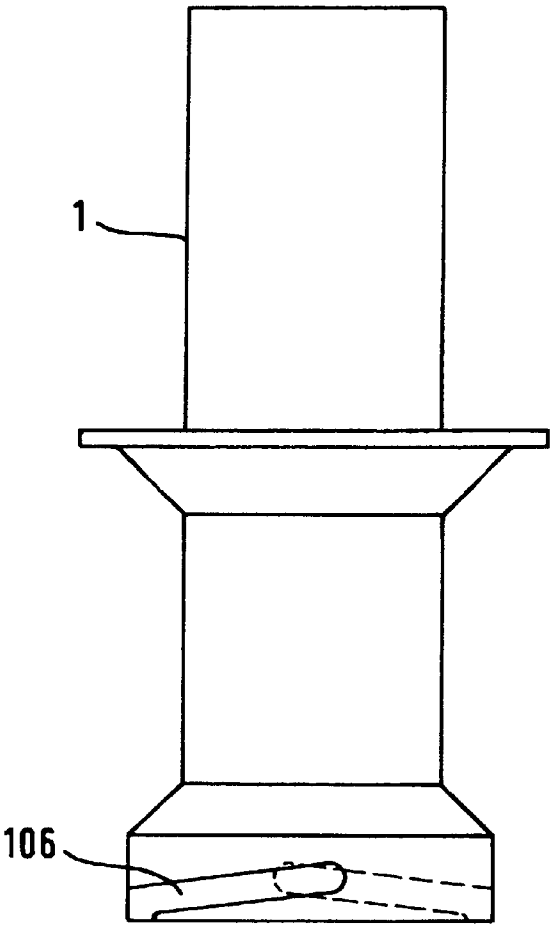
FIGS. 8*a*, 8*b*, and 8*c* show a contact arrangement having a contact carrier FIG. (8*a*) and a contact piece (FIG. 8*b*), as well as a top view of the contact piece having a bayonet lock (FIG. 8*c*).
Figure 8B:
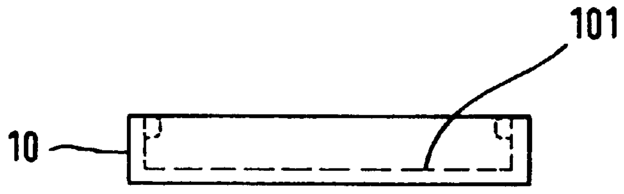
Figure 8C:
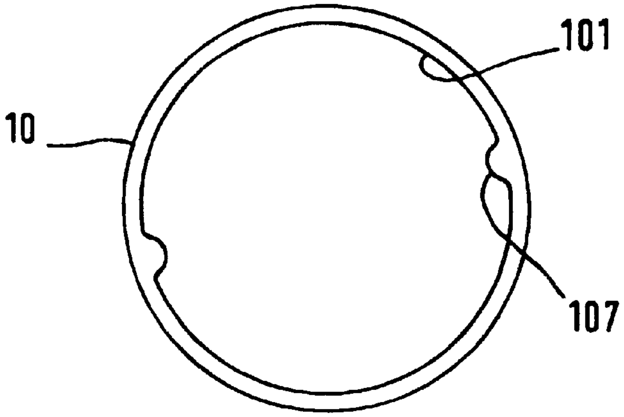

In FIGS. 8*a* and *b*, the contact arrangement is depicted having a contact carrier 1 in the form of a moving conductor and a contact piece 10 having a cup-shaped recess 101, which is configured for a mechanical bond in the form of a bayonet lock. In FIG. 8*c*, the top view of contact piece 10 having recess 101 and two lugs 107 protruding to the inside are depicted, which are shaped so as to protrude on the cylindrical interior side of recess 101. Contact carrier 1 on the lateral surface in the area coming into contact with contact piece 10 has oppositely oriented grooves 106 arranged so as to run slightly diagonally, into which contact piece 10 having its lugs 107 can be introduced in a screw-like fashion. Via a short rotation, contact piece 10 is then firmly pressed onto contact carrier 1. The remaining gap can then also be filled using solder, as is explained in FIGS. 2*a* and 2*b*, or also using solders from a solder repository, as is depicted, for example, in FIGS. 3*a*, 4*a*, 5, and the soldered connection is produced.

The bayonet lock between contact piece and contact carrier can also have two or more beveled grooves and protuberances situated on the periphery, the grooves being able to be configured either on the contact carrier or on the contact piece, and the lugs then on the respective other part. For further improving the fixing of the contact piece on the contact carrier using a bayonet lock, the groove/grooves can also be given a slightly conical shape, i.e., tapering at the end, so that during the rotation of the parts to be joined with each other, a firm, gripping screw connection is achieved in the contact carrier made of a soft copper. In addition, n contact carrier can also be used as a solder supply channel and also forms a good solder connection area between the contact carrier and contact piece.

In FIG. 7, a vacuum switching tube is schematically depicted having a fixedly arranged contact carrier 2, and having a contact piece 20 fixedly joined via a soldered connection 31, as well as having a contact arrangement, movable in the axial direction of the arrow, including contact carrier 1 and contact piece 10, fixedly joined via the soldered connection 30, for example, as in FIG. 2*b*. The housing is composed of pot-like cover parts 5 and 6, an insulator 8 being arranged in between. The one pot-like cover is soldered to stationary contact carrier 2 in the area of connecting surfaces 32—soldering points. Other pot-like cover 6 is secured at movable contact carrier 1, specifically via two soldering points 34,36, a bellows 7 being connected in between. Pot-like covers 6,5 are also connected to the insulator via soldering points 35,33. On the interior side of contact pieces 10, 20, shielding part 4 having getter ring 3 is arranged for shielding the metal vapor arc, retaining the radiation heat, and dissipating the latter in the covers, as well as for sufficiently shielding the insulator from condensing metal vapor.

Using the method according to the present invention for the possibility of the contact soldering of contact piece 10 to the contact carrier in the latter's hanging position, as is explained in FIGS. 3*a* through 5, it is possible to reassemble the vacuum tube depicted in FIG. 7 and its components, to arrange the corresponding soldering material in the area of the contact gap of contact piece 10 and contact carrier 1 as well as at all connection points to be soldered 31, 32, 33, 34, 35, 36, and then to place the assembly, preassembled in this manner, into a vacuum soldering oven, and there, in a vacuum, through the application of heat, to produce all of the soldering connections in one working cycle—an oven cycle.

What is claimed is:

1. A method for manufacturing a contact arrangement for a vacuum switching tube, the contact arrangement including a contact carrier and a contact piece, the method comprising:

bringing the contact piece and the contract carrier together so as to form a gap therebetween;

positioning a soldering material adjacent to the gap; and bringing the soldering material to a melting point in a vacuum so that molten soldering material penetrates into the gap;

wherein the contact piece includes a planar saucer-shaped recess and the bringing the contact piece and the contact carrier together includes pressing a mounting end of the contact carrier into the recess so that the gap includes a planar portion and an annular portion.

2. The method as recited in claim 1 wherein the contact carrier includes an electrically highly conductive material and the contact piece includes a flame-resistant sintering material including copper.

3. The method as recited in claim 1 wherein the highly conductive material includes copper.

4. The method as recited in claim 1 wherein the positioning includes disposing the soldering material in circular fashion around an edge of the annular portion of the gap so that after the bringing the soldering material to the melting point the molten soldering material penetrates into the annular portion of the gap by at least one of gravity and capillary action.

5. The method as recited in claim 4 wherein after the bringing the soldering material to the melting point the molten soldering material penetrates to the planar portion of the gap by at least one of gravity and capillary action.

6. The method as recited in claim 1 wherein the contact carrier defines at least one bore hole opening at the recess and the positioning includes disposing the soldering material in the at least one bore hole so that after the bringing the soldering material to the melting point the molten soldering material penetrates into at least the annular portion of the gap by at least one of gravity and capillary action.

7. The method as recited in claim 1 wherein the contact carrier includes at least one second recess and wherein the positioning includes disposing soldering material in the at least one second recess so that after the bringing the soldering material to the melting point the molten soldering material penetrates into at least the annular portion of the gap by at least one of gravity and capillary action.

8. The method as recited in claim 1 wherein the soldering material includes a soldering paste and further comprising applying the soldering paste in a coating onto the contact piece and over an end of the annular portion of the gap so that after the bringing the soldering material to the melting point, the molten soldering material penetrates into the gap at least one of gravity and capillary action.

9. The method as recited in claim 1 further comprising forming at least one of a mechanical, a frictional-locking and a positive-locking bond between the contact carrier and the contact piece.

10. The method as recited in claim 1 wherein the vacuum switching tube further includes a plurality of components having respective connecting points provided with a respective additional soldering material and wherein the bringing the soldering material to the melting point is performed at a same time as a bringing of the respective additional soldering material to a respective melting point so that the respective additional soldering material melts simultaneously with the melting of the soldering material adjacent to the gap.

11. The method as recited in claim 10 wherein the bringing of the soldering material to the melting point and the bringing of the additional soldering material to the respective melting point are performed in a same vacuum soldering oven.

12. The method as recited in claim 10 wherein the plurality of components includes at least one of a second contact arrangement, a shielding part, a cover part, an insulator part and a bellows.

13. The method as recited in claim 10 wherein the contact arrangement and the plurality of components are preassembled.

14. A method for manufacturing a contact arrangement for a vacuum switching tube, the contact arrangement including a contact carrier and a contact piece, the method comprising:

bringing the contact piece and the contract carrier together so as to form a gap therebetween;

positioning a soldering material adjacent to the gap;

bringing the soldering material to a melting point in a vacuum so that molten soldering material penetrates into the gap; and using a portion of the molten solder to seal a supply location of the soldering material.

15. The method as recited in claim 14 wherein the supply location includes at least one bore hole.

16. The method as recited in claim 14 wherein the contact carrier includes an electrically highly conductive material and the contact piece includes a flame-resistant sintering material including copper.

17. The method as recited in claim 16 wherein the highly conductive material includes copper.

18. The method as recited in claim 14 further comprising forming at least one of a mechanical, a frictional-locking and a positive-locking bond between the contact carrier and the contact piece.

19. The method as recited in claim 14 wherein the vacuum switching tube further includes a plurality of components having respective connecting points provided with a respective additional soldering material and wherein the bringing the soldering material to the melting point is performed at a same time as a bringing of the respective additional soldering material to a respective melting point so that the respective additional soldering material melts simultaneously with the melting of the soldering material adjacent to the gap.

20. The method as recited in claim 19 wherein the bringing of the soldering material to the melting point and the bringing of the additional soldering material to the respective melting point are performed in a same vacuum soldering oven.

21. The method as recited in claim 19 wherein the plurality of components includes at least one of a second contact arrangement, a shielding part, a cover part, an insulator part and a bellows.

22. The method as recited in claim 19 wherein the contact arrangement and the plurality of components are preassembled.

* * * * *